UNITED STATES PATENT OFFICE.

MAX AMS, OF NEW YORK, N. Y.

IMPROVEMENT IN PROCESSES OF PRESERVING CAVIAR.

Specification forming part of Letters Patent No. 169,668, dated November 9, 1875; application filed September 25, 1875.

*To all whom it may concern:*

Be it known that I, MAX AMS, of the city, county, and State of New York, have invented a new and Improved Method of Packing and Preserving Caviar, of which the following is a specification:

This invention has for its object to so prepare the roes or eggs of the sturgeon, which are commonly known as caviar, that the same will keep during the warmer seasons, even if exposed to the atmosphere, and still retain their peculiar flavor and softness.

The peculiar taste of the caviar, and its jelly-like softness, are due, to a great extent, to a fine essential oil which surrounds the roes or ova and keeps off the air, and it must, therefore, be the main object in preserving the caviar to retain such essential oil in contact with the bodies of the eggs.

In a raw condition the caviar will soon decompose, especially in a warm season, and even if packed in air-tight boxes it would decompose soon after the can had been opened, or even within the same.

Now, it has been found that in attempting to preserve the caviar by any of the ordinary methods—*i. e.*, by boiling or heating in an open vessel, or steaming in a closed vessel—the essential oil will be evaporated and separated from the eggs, leaving the latter separated from the coating, which softened the shells, and causing the eggs to become dry and hard, and to lose the qualities, and also the aroma, for which they are esteemed.

Now, my invention consists in the peculiar process of treating the caviar, so as to render it preservative without robbing it of the essential oil by which the ova are surrounded, or in any way destroying their taste, flavor, or appearance.

This process is as follows: The roes or eggs of the sturgeon, after being taken from the fish, are properly washed, and sieved to allow the water used in washing to escape. They are then salted, according to taste, in the usual manner. After being so prepared the caviar is packed in tin cans, which are immediately closed air-tight by soldering or otherwise. The cans are next exposed to a gentle heat, which is very gradually increased to no less than 140° nor no more than 200° Fahrenheit.

By this process, which must be, as already stated, very gradually carried on, the salt, which was mixed with the ova, will be caused to combine with the extraneous matter sufficiently to protect the same thoroughly against decomposition, and to constitute, also, a protective covering for the ova, and yet the heat is insufficient to cause the evaporation of the essential oil, or, in fact, any evaporation whatsoever. If the heat were suddenly applied evaporation would, nevertheless, take place to a greater or less extent.

If the caviar were heated to less than 140° the effect above referred to would not be obtained, and decomposition would take place. While, on the other side, if the heat were to exceed 200° evaporation of the essential oils would certainly take place, and the eggs would be left dry, brittle, and tasteless.

After the process above referred to has been completed, the can must be punctured, to allow the excess of air, which is caused by the expansion of the ova under the heat, to escape, and the puncture is thereupon at once reclosed to retain the caviar in an air-tight package.

Thus prepared the caviar may be preserved for an indefinite length of time, and will be found on the opening of the cans to have retained its original freshness and flavor.

I am aware that fish have heretofore been prepared for food by exposing them to a temperature of about 170° Fahrenheit, and treating them with an acid to dissolve the bones, such a process being described in the patent of G. H. Heron, November 5, 1867, No. 70,435; but this process I do not claim, nor is the same applicable for preserving caviar, as the shells of the ova of the caviar should not be dissolved, but must retain their form, body, and original nature, and my invention, therefore, has reference to the peculiar treatment of the caviar described with salt, but without an acid.

I claim as my invention—

The process herein described of preparing caviar, after the admixture of salt, by exposing the same in air-tight cans to gradual heat of not less than 140° nor more than 200° Fahrenheit, substantially as specified.

The foregoing specification of my invention signed by me this 24th day of September, 1875.

MAX AMS.

Witnesses:
E. C. WEBB,
A. V. BRIESEN.